United States Patent [19]
Schaedler

[11] 3,932,071
[45] Jan. 13, 1976

[54] OVERSPEED SAFTEY CONTROL MECHANISM FOR ROTARY TOOLS

[75] Inventor: Raymond J. Schaedler, New Hartford, N.Y.

[73] Assignee: Chicago Pneumatic Tool Company, New York, N.Y.

[22] Filed: Aug. 28, 1974

[21] Appl. No.: 501,464

[52] U.S. Cl. ................................ 418/43; 137/57
[51] Int. Cl.² ................ F01C 21/12; G05D 13/10
[58] Field of Search ........................ 418/40–44; 137/50, 56, 57

[56] References Cited
UNITED STATES PATENTS
3,749,530   7/1973   Amador ............................ 418/41

FOREIGN PATENTS OR APPLICATIONS
467,506   8/1950   Canada ............................ 418/41

Primary Examiner—John J. Vrablik
Attorney, Agent, or Firm—Stephen J. Rudy

[57] ABSTRACT

Overspeed safety control mechanism for shutting off operating air flow to the motor of a rotary surface grinding tool when the motor overspeeds beyond a rated governed maximum, including a circular body rotatable with the motor and carrying a ball valve which is adapted to be centrifugally released and entered into a pocket to block flow of operating air to the motor when the latter overspeeds, the speed of the motor being normally controlled by a speed governor.

6 Claims, 3 Drawing Figures

3,932,071

OVERSPEED SAFTEY CONTROL MECHANISM FOR ROTARY TOOLS

BACKGROUND OF THE INVENTION

This invention is concerned with the improvement of a tool having an air driven motor with an overspeed safety mechanism to ensure the air motor from developing a speed beyond a predetermined safe limit.

The overspeed mechanism is especially suited for high speed surface grinding tools because of the dangers presented by such tools should they, for some reason, overspeed without control. Such tools are usually equipped with a speed control governor which functions to maintain the operation of the motor within the safe limits of a predetermined speed rate. However, there is the possibility of the governor malfunctioning due to entry of dirt, breaking of parts, accumulation of rust, and other reasons, so that the motor could develop an undesirable overspeed condition.

The safety mechanism of the present invention may be used in rotary tools without speed regulating governors as well as in tools having such governors. In either case, the safety mechanism is intended to stop flow of operating air to the motor when a predetermined overspeed condition develops. When incorporated in a tool having a speed regulating governor, the latter functions primarily to maintain the speed of the motor substantially at a predetermined rate; and, when the motor develops a predetermined higher level of speed or overspeed condition, the safety mechanism functions automatically to shut off air flow to the motor and thus causes the latter to stop.

The safety mechanism is so designed that when it is caused to operate, the tool becomes disabled and cannot be effectively further operated until the tool is taken apart and the safety mechanism reset. Normally, the safety mechanism would not be reset until after an inspection of the tool as to the cause for the overspeeding had first been made and after any necessary repairs have been made.

In accordance with the invention, there is provided for incorporation in a tool having an air driven rotary motor centrifugally operable air shut-off control mechanism comprising an annular body member mounted to a rotor shaft and having a radially extending hole in its periphery in which a heavy ball valve is releasably retained by the free ends of a curved spring mounted to the periphery of the body member, the ball valve being responsive to centrifugal forces developed by an overspeed condition of the motor to escape tangently from between the ends of the spring and seat in a pocket to seal an inlet port so as to cut off further flow of operating air to the motor.

BRIEF DESCRIPTION OF THE DRAWING

In order that the invention may be fully understood and readily carried into effect, the same will now be described with reference to the accompanying drawing, of which.

DESCRIPTION OF A PREFERRED EMBODIMENT OF THE INVENTION

Figure 1:
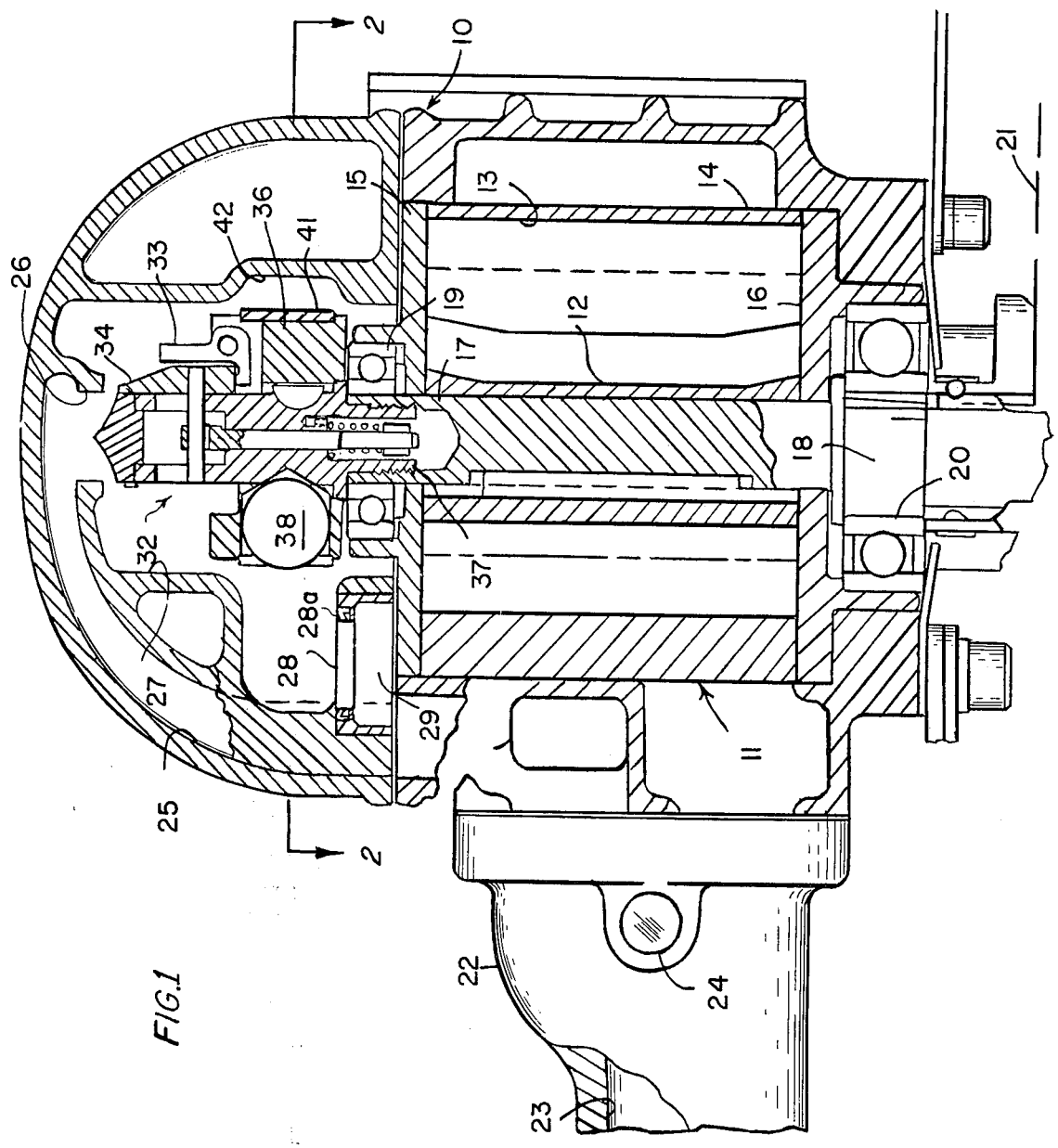
FIG. 1 is a sectional view of a vertical surface grinding tool in which the invention is incorporated.
Figure 2:
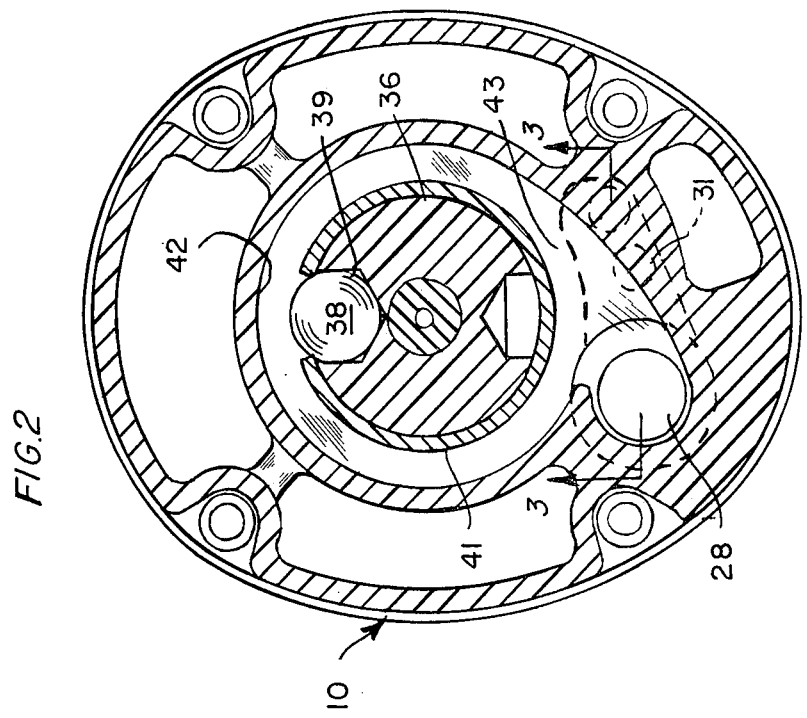
FIG. 2 is a section taken on line 2—2 of FIG. 1.

Referring now to the drawing, there is shown a pneumatically powered rotary surface grinding tool of the vertical type having a housing 10 in which is housed a rotary air driven motor 11 of the slidable vane type.

The motor has a rotor 12 which operates in a chamber 13 defined by a surrounding liner 14, the upper and lower ends of which chamber are respectively closed by bearing end plates 15 and 16.

Upper and lower ends 17 and 18 of the rotor shaft are supported respectively in bearings 19 and 20. An externally projecting portion of the lower shaft end 18 carries a surface grinding wheel 21 (broken line).

A pair of the usual handles (a portion of one being shown at 22), extending from a side area of the housing, are adapted to be held by the operator when using the tool.

An air inlet passage 23 extending through handle 22 is connectible at the outer end of the handle to a source of pressure air. Passage 23 connects through the usual lever operable throttle valve at 24 with a passage 25 in the housing leading to a first normally open valve controlled inlet port 26. The latter opens into a governor chamber 27, which in turn connects with a second normally open valve controlled safety inlet port 28. The latter defines the mouth of a shallow pocket or passage 29 leading to ports 31 opening into the motor chamber 13.

A speed control governor 32 mounted for rotation with the rotor shaft carries flyweights 33 (one being shown) which are responsive to centrifugal forces developing at a predetermined speed of the motor to slide a sleeve valve 34 against the bias of a return spring into restricting relation to the first control port 26. This governor action regulates the flow of air to the motor and, as a result, curbs the speed of the motor to a substantially constant rate.

The governor has an annular body 36 upon which the flyweights are pivotally supported. The governor body has an axially depending stem 37 threaddedly engaged in the upper end of the rotor shaft, whereby the governor rotates in unison with the motor.

If, for some reason, the governor should fail to properly control air flow through the first control port 26 to the motor and thereby cause the motor to develop a runaway or overspeed condition, that is, a predetermined rate of speed higher than that of the governor controlled rate; a safety ball valve 38, releasably retained in the governor body, will respond to centrifugal force of a certain level developed by the motor to interrupt further flow of operating air to the motor. The ball valve will centrifugally escape from the body member and enter the second control port 28 to block it against further flow of inlet air to the motor.

The governor body 36 serves not only as a support for the governor, but also as a retainer and carrier for the ball valve 38. The ball valve is formed of heavy material such as steel; and it is normally seated in a hole 39 extending radially into the periphery of the body member 36. A curved leaf snap spring 41 is snapped or fitted about the periphery of the body member or ball carrier 36. It serves as a gate releasably confining the ball valve in the hole 39. The spring substantially surrounds the periphery of the body member so that its free ends partially overlie opposite edges of the entrance to the hole as well as the ball valve therein, whereby the ball valve is normally retained under the tension of the spring in the hole or socket. The ends of the spring are adapted to be resiliently forced apart sufficiently to allow the ball valve to escape from the hole when the ball valve is centrifugally urged outwardly of the latter.

An internal wall of the housing surrounding the ball carrier 36 defines a ball track 42, the course of which is for its greater part concentric with the ball carrier. The track has a relatively wider portion at 43 extending tangently away from the ball carrier and defining a guide or path for the ball valve leading to the pocket 29. The second control port 28 provides an entrance to the pocket. The pocket connects with the ports 31 leading to the motor chamber 13.

Figure 3:
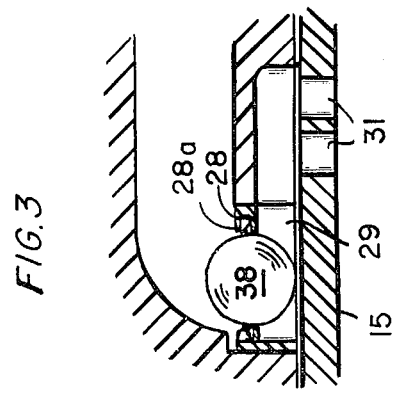
FIG. 3 is a section taken on line 3—3 of FIG. 2.

The ball valve upon entering the second control port settles upon the bottom of the shallow pocket with its upper surface protruding out of the control port in sealing relation to the latter, as indicated in FIG. 3. Means 28a is fitted in port 28 to seal the ball valve in the latter and to retain it therein against escape. Means 28a is shown here as a conventional oil seal defining a lip about the entrance to port 28. The lip is yieldable to allow entry therethrough of the heavy ball valve into pocket 29, but operates to prevent its escape from the pocket. The lip engages about the surface of the ball valve to block flow of air around the latter to the motor.

In summary, when the throttle valve 24 in the handle is moved to open condition, inlet air flows from the source, in order, through the first and second control ports 26, 28 to the motor chamber to operate the motor. The governor functions in response to centrifugal forces developed by the motor to regulate the flow of air to the latter so as to maintain the speed of the motor at a substantially constant predetermined rate. If, because of failure of the governor or other reason, the speed of the motor should develop to a predetermined degree beyond that normally permitted by the governor, the resultant centrifugal forces will force the ball valve 38 outwardly of the hole 39. In this action, the ends of the retaining spring 41 yieldably spread apart, allowing the ball valve to enter the track 42. The concentric portion of the track has a lateral dimension relative to the ball carrier approximating the radius of the ball valve so that when the ball valve is forced into this portion of the track it will not have fully escaped from the ball carrier and will be rolled about the track by the carrier until the broader tangent area 43 of the track is reached. The ball valve will then centrifugally roll off along this broader area into the pocket 29 to close the second control port 28 and block further flow of operating air to the motor.

Once the ball valve has escaped from the ball carrier through the retaining spring and entered the pocket, the tool can no longer be effectively operated until the tool is dismantled and the ball valve is removed from the pocket and again confined in the hole of the ball carrier. Normally, before doing the latter, the operator will inspect the tool for the cause of its faulty operation and will make whatever repairs may be needed.

I claim:

1. In a tool including a rotary air motor having a rotor shaft, an inlet port for admitting operating air to drive the rotor, a circular body axially mounted to the shaft for rotation with the latter, said body member having a radial hole in its periphery, a ball valve slidably received in the hole and adapted to be centrifugally expelled from the hole upon the motor developing centrifugal force of a certain value, track means for receiving the expelled ball valve and guiding it into closing relation with the inlet port, and means fitted in the inlet port for retaining the ball valve in said closing relation.

2. In a tool as in claim 2, wherein a yieldable gate normally restrains the ball valve in the hole against release therefrom by centrifugal forces of less than said certain value.

3. A surface grinding tool including a rotary air motor having a rotor shaft, an inlet port for admitting operating air to drive the motor, a circular body carried by the shaft disposed in coaxial relation to the latter and having a radial hole in its periphery, a ball valve received in the hole, a yieldable gate releasably retaining the ball valve in the hole, the ball valve being adapted to be centrifugally forced from the hole through the gate upon the motor developing a certain degree of speed and adapted when so released to enter the inlet port in closing relation to the latter, and means fitted in the inlet port for retaining the ball valve in said closing relation.

4. A surface grinding tool as in claim 3, wherein track means surrounding the circular body is provided for receiving the ball from the hole and guiding it into the inlet port.

5. A surface grinding tool as in claim 3, wherein the yieldable gate is a spring carried by the circular body partially overlying both the hole and the ball valve in the latter.

6. A surface grinding tool, including a rotary air motor having a rotor shaft adapted to carry a surface grinding wheel, a circular body carried by the shaft in coaxial relation thereto and having a radial hole in its periphery, a passage for conducting live air to operate the motor, a first valve controlled port arranged intermediately of the passage, speed responsive governor controlled valve means carried by the rotor shaft for regulating air flow through the first port, a normally open second valve controlled port disposed in the passage between the first port and the motor, and a ball valve slidably received in the hole of the circular body, the ball valve being centrifugally movable out of the hole upon development of centrifugal forces of a certain value by the motor, track means for receiving the ball valve when thus released and guiding it into closing relation with the second port, and means fitted in the second port for retaining the ball valve in said closing relation.

* * * * *